July 10, 1928.
A. L. BREITENSTEIN
1,676,630
SEPARABLE FASTENER
Filed Jan. 27, 1926
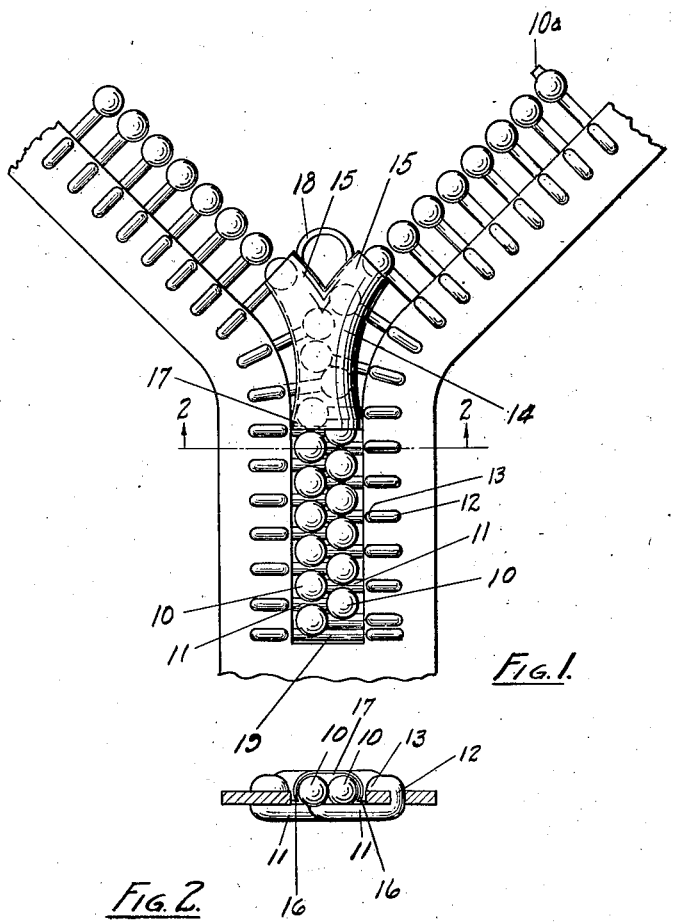
INVENTOR.
ARTHUR L. BREITENSTEIN.
BY
ATTORNEY.

Patented July 10, 1928.

1,676,630

UNITED STATES PATENT OFFICE.

ARTHUR L. BREITENSTEIN, OF AKRON, OHIO; MAUDE E. BREITENSTEIN ADMINISTRATRIX OF SAID ARTHUR L. BREITENSTEIN, DECEASED.

SEPARABLE FASTENER.

Application filed January 27, 1926. Serial No. 84,091.

This invention relates to separable fasteners of that type employed on the meeting edges of a closure for boots, gaiters, bags, pouches and other articles, and includes rows of fastening elements which are adapted to be brought into interlocking engagement by a movable slide and to be unfastened by a reverse movement of the slide.

The chief object of the invention is to provide an improved fastener of the type described above which will be simple in construction, inexpensive to manufacture, and easy to operate, and especially a fastener which will be highly flexible but sturdy and capable of long wear under repeated flexing action without resulting in binding of the slide on the fastener elements, preventing operation thereof.

The above and other objects are obtained by the construction of separable fastener shown in the accompanying drawings and described below. It will be understood that the invention is not limited to the specific form thereof shown and described.

Of the accompanying drawings:

Figure 1 is a front view of a separable fastener embodying the invention, a portion of the fastener being closed and another portion being open; and Figure 2 is a section on line 2—2 of Figure 1.

The fastening elements of the invention comprise heads 10, 10, preferably spherical, and lying nearly in contact with each other in each row and substantially in a common plane, heads 10 being supported on off-set shanks 11, 11 connected thereto and extending to the edges of the closures, out of obstructing relation to balls 10 within their plane, and preferably in a common plane beneath that of the heads, shanks 11 being connected to the edges of the closure in any suitable manner as by being originally formed with an outwardly directed portion 12 having a pointed end 13 and inserted through the material of the closure, the pointed end being bent over to secure the element in place.

The elements are secured in staggered relation on opposite sides of the enclosure and the shanks 11 are of such length that by flexing of the edges of the closure at an angle in the plane thereof, the balls 10 in one row may be engaged in back of and interlocked with balls in the opposite row, with the balls 10 of one row interlocked with the shanks 11 of the other.

Thus it will be seen that the balls or heads 10 prevent separation of the fastener in the plane of the closure, and the shanks 11 prevent movement of the balls 10 either inwardly or outwardly from their interlocked positions.

For flexing the edges of the closure and guiding the balls 10 into or away from cooperation with each other, a slide 14 is employed. Slide 14 is formed with upper branch, angular guide grooves 15, 15 on its under surface provided by flanges, such as indicated at 16, 16, but adapted to embrace only a single ball 10. Grooves 15 merge into a common straight groove 17 adapted to be directed in the line of the closure and having the flanges 16 thereon adapted to embrace two balls 10 in cooperation with each other. Any suitable means may be provided, such as loop 18, for facilitating operation of slide 14.

At one end of the closure, a shank 19 is secured in the opposite sides thereof, so as to pass under the last ball 10 to support the same. At the other end of the closure, a ball 10 may have a stop 10$^a$ thereon arranged to engage slide 14 to prevent its movement off the rows of fastener elements.

Operation of the device may be briefly described as follows:

Referring to Figure 1, closing of the fastener is accomplished by moving the slide 14 upwardly. This draws the rows of fastening elements together at an angle and so flexes the edges of the closure, as to space balls 10, apart sufficiently so that a ball 10 in one row passes between a pair of balls 10 on the oposite row. To open the fastener, the slide 14 is operated downwardly, flexing the oppoite sides of the closure to separate the balls 10 and drawing the edges of the closure apart to slide the balls 10 out of interlocking relationship. The spherical or ball-shaped heads 10 slide easily past one another into or out of interlocking relationship with a minimum of friction and also have a minimum of friction on the guide flanges 16 of slide 14, whereby binding of the slide on the fasteners is avoided.

It will appear that considerable clearance (less than the width of a shank) may be provided between the balls in each row and also between the balls of the opposite rows when interlocked. Thus easy flexing of the fastener in all directions is permissible without causing separation thereof or distortion or bending of the elements resulting in binding of the slide 14 thereon.

Modifications of the invention may be resorted to without departing from the spirit thereof or the scope of the appended claims.

What is claimed is:

1. A separable fastener, comprising rows of fastening elements attached to opposite sides of a closure, the elements comprising ball-shaped heads lying in a plane and connected to the edges of the closure in closely spaced relation by shanks lying beneath the plane, the elements in each row being staggered with respect to those in the other row, whereby by flexing apart the edges of the closure the opposite heads may be so spaced that they can freely pass between each other and to or from interlocking positions in which the rows of heads are in back of each other and in overlying relation to the shanks of each other, and a slide adapted to cooperate with the rows of elements, said slide having angularly directed guide grooves, one for each row of heads, and merging into a straight guide groove for a double row of heads so as to flex the edges of the closure and to guide the opposite heads of each row between those of the other into or away from their interlocked positions.

2. A separable fastener, comprising rows of fastening elements attached to opposite sides of a closure, the elements comprising ball-shaped heads lying in a plane and connected to the edges of the closure in closely spaced relation by shanks lying beneath the plane, the elements in each row being staggered with respect to those in the other row, whereby by flexing apart the edges of the closure the opposite heads may be so spaced that they can freely pass between each other and to or from interlocking positions in which the rows of heads are in back of each other and in overlying relation to the shanks of each other, and a slide adapted to cooperate with the rows of elements progressively to move them to or from interlocked relationship.

3. In a separable fastener, rows of fastening elements attached to opposite sides of a closure, the elements comprising ball-shaped heads lying in a plane and connected to the edges of the closure in closely spaced relation by shanks lying beneath the plane, the elements in each row being staggered with respect to those in the other row, whereby by flexing apart the edges of the closure the opposite heads may be so spaced that they can freely pass between each other and to or from interlocking positions in which the rows of heads are in back of each other and in overlying relation to the shanks of each other.

4. In a separable fastener, rows of fastening elements connected to opposite sides of a closure, the elements comprising shanks connected to the edges of the closure in staggered relationship on opposite sides of the closure and extending toward each other in a common plane, said shanks having enlarged heads thereon extending out of said plane on the outer side only thereof and in closely spaced relationship but adapted to be spaced apart by flexing the edges of the closure whereby the heads of each row may pass between the heads of the other to or from interlocking positions with the heads of each row overlying the shanks of the other row.

5. In a separable fastener, rows of fastening elements on each side of a closure, each element comprising a head and an offset shank connecting the head to an edge of the closure, the heads being in a common plane and the shanks in a common plane offset therefrom, the heads being entirely outwardly of the shanks, the elements in each row being staggered with respect to those in the other, and spaced apart so that the heads in each row are separated a distance less than the width of a shank but adapted, when the edges of the closure are progressively flexed together or apart, to pass between the heads of the other row so that when fastened the rows of heads are on opposite sides of each other from their original positions and in interlocked relationship with each other and with the shanks of each other.

6. In a separable fastener, rows of fastening elements attached in staggered relationship on the opposite sides of a closure, the elements being similar and each comprising a shank having an enlarged, substantially spherical head thereon, the rows being adapted to be separably interlocked so that the rows of heads are in interlocking relation with each other and with the shanks of each other on one side only of the shanks.

7. In a separable fastener, rows of fastening elements attached in staggered relationship on the opposite sides of an enclosure, the elements being similar and each comprising an enlarged head, all the heads being in a plane unobstructed so that they are freely movable by flexing the closure in its own plane between opposite heads and to interlocked positions in back of opposite heads, and means for connecting each head to an edge of the closure, the connecting means for the heads being arranged substantially entirely inwardly thereof to prevent their movement out of the common plane.

8. In a separable fastener, rows of fastening elements on the opposite sides of a closure, the elements in each row being staggered with respect to those in the other, and comprising enlarged heads connected to the edges of the closure by shanks offset therefrom so that by flexure of the fastener in its own plane the heads of each row are freely movable between those of the other into or from positions with each row of heads in back of the other and overlying the shanks of the other on one side only of the shanks.

9. In a device of the class described, a double series of stems and fasteners therefor, for attachment thereof to opposing edges of a piece of fabric, and spherical elements on the outer ends of said stems, adapted for interlocking with the similar elements on the opposing series of stems, said stems being disposed so as to support said elements in a plane at one side of the plane of the fabric to which they are attached.

ARTHUR L. BREITENSTEIN.